United States Patent

[11] 3,523,474

| [72] | Inventor | William G. Kinslow, Jr.<br>Kansas City, Missouri |
|---|---|---|
| [21] | Appl. No. | 721,377 |
| [22] | Filed | April 15, 1968 |
| [45] | Patented | Aug. 11, 1970 |
| [73] | Assignee | Phillips Petroleum Company<br>a Corp. of Delaware |

[54] PRECISION TRIMMING OF THERMOFORMED PARTS
5 Claims, 3 Drawing Figs.

[52] U.S. Cl...................................................... 83/40,
83/50, 83/152, 83/402, 83/914; 264/153
[51] Int. Cl...................................................... B26f 1/40
[50] Field of Search............................................ 83/40, 50,
55, 152, 402, 85, 100, 98, 99, 914; 264/153;
18/19(P), 30(Y)

[56] References Cited
UNITED STATES PATENTS

| 2,218,541 | 10/1940 | Kronquest | 83/100X |
| 2,386,147 | 10/1945 | Sidebotham | 83/40 |
| 2,391,304 | 12/1945 | Fink | 83/100X |
| 2,941,341 | 6/1960 | Clinton | 83/100X |
| 3,127,803 | 4/1964 | Midgley | 83/85X |
| 3,240,851 | 3/1966 | Scalora | 264/153 |
| 3,350,744 | 11/1967 | Sederlund et al | 18/19 |

Primary Examiner— Frank T. Yost
Attorney—Young and Quigg

ABSTRACT: Formed thermoplastic objects are accurately trimmed from a sheet on which they are formed by drawing a vacuum between the objects and a punch member thereby positioning the object on the punch before the cooperating action of the punch and a corresponding die shear the object from the sheet. When simultaneously trimming a plurality of formed objects from a sheet with cooperating die and punch members, the sheet can be slit between the formed objects to compensate for distortion of the sheet material due to shrinkage and the like resulting from the forming operation to thereby allow each part to be more accurately seated or centered on a corresponding punch member.

INVENTOR.
W.G. KINSLOW JR.

INVENTOR.
W. G. KINSLOW JR.

PRECISION TRIMMING OF THERMOFORMED PARTS

This invention relates to formed objects. In another aspect, this invention relates to a method and apparatus for severing formed objects from a sheet of thermoplastic material.

The molding of formed objects, such as containers for example, from thermoplastic sheet material can be accomplished by a number of conventional methods such as vacuum forming, straight mechanical forming, and drape forming. Generally, a plurality of objects are simultaneously formed on a sheet of thermoplastic material and then subsequently severed therefrom.

One conventional method of separating the formed objects from the sheet material involves shearing the objects from the sheet material by a corresponding plurality of punch and die members at a position external from the mold. However, the use of these external matching punch and die members generally results in ragged or uneven edges on the formed objects. These ragged and uneven edges are particularly undesirable when the severed article is a cup or a container top. Also, these ragged and uneven edges have caused problems in commercial feeding and transporting equipment wherein the uneven or ragged edge will snag and cause a stoppage.

The poor quality of the severed object when utilizing punch and die means external to the mold generally results because it is very difficult to align the series of formed objects on the sheet material with a corresponding series of matching punch and die members. This difficulty generally results from the inability to maintain very close tolerance of the punch and die members, and the inability to align the plurality of formed objects with the corresponding plurality of punch and die means because of such factors as distortion of the sheet material which occurs in the forming operation. Various other elaborate methods have been devised for trimming formed objects from sheet material while the objects are maintained within the molding zone. However, these methods are generally unsatisfactory in thermoforming operations because the severed object cannot be completely released from the mold until it has cooled sufficiently to prevent deformation of the object in a container collection system. Thus, the increase in cycle time of operation when utilizing these methods is generally prohibitive.

One object of this invention is to provide an improved method and apparatus for severing formed objects from a sheet of plastic material.

Another object of this invention is to provide an improved method and apparatus for severing a plurality of thermoformed objects from a sheet of plastic material.

According to one embodiment of this invention, formed objects are severed from sheet material by drawing a vacuum between each object and a punch member to thereby center the object on the punch member before the cooperating action of the punch member and a mating die member sever the object from the sheet material. According to another embodiment of this invention a plurality of thermoformed objects are severed from a sheet of thermoplastic material by initially longitudinally and/or transversely slitting said sheet at points between the formed objects and then severing a plurality of said objects from said sheet by the process of the first embodiment. The thermoforming operation generally causes the sheet material to distort such as by shrinking, and the above slitting process will allow the action of the vacuum and the punch member to accurately position each individual object on its corresponding punch member.

This invention can be more easily understood from a study of the drawings in which.

Figure 1:
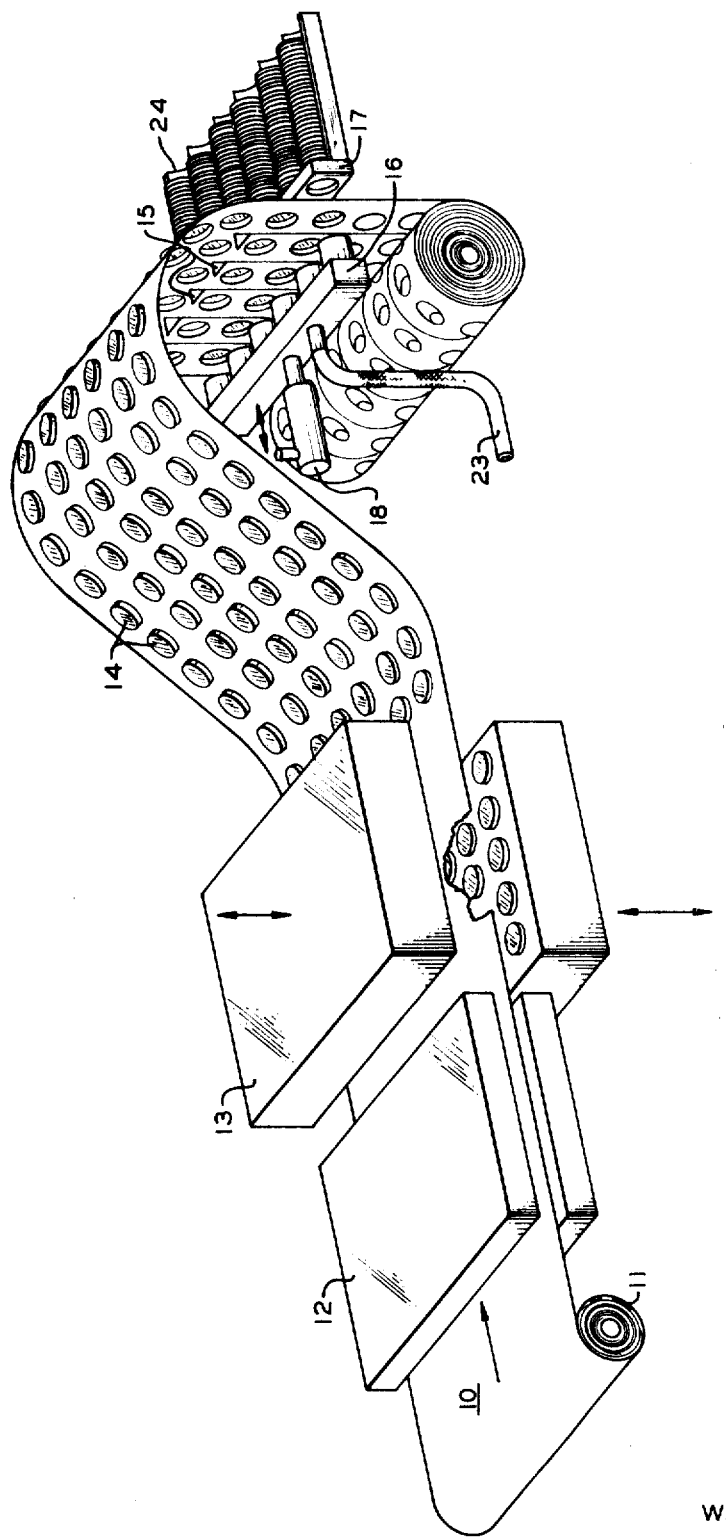
FIGURE 1 is a perspective view illustrating a preferred embodiment of this invention.

Now referring to FIGURE 1, a thermoplastic sheet material 10 such as medium impact polystyrene is fed from roll 11 through heater 12 which heats the sheet to a suitable thermoforming temperature such as the temperature in the range of from 150°F to 550°F. Sheet 10 passes from heater 12 through vacuum forming machine 13 which is adapted to simultaneously form a plurality of objects 14 such as snap-on closure lids for cups. As illustrated, vacuum forming machine 13 forms 6 rows of 5 objects each. Vacuum forming machine 13 can be any suitable apparatus known in the art such as a Brown thermoformer Model No. 621, from Brown Machine Company, Inc., Beaver Town, Michigan.

Sheet 10 carrying a plurality of formed objects 14 is then passed over a plurality of slitting knives 15 which in this embodiment cut sheet 10 continuously along 5 points between the 6 rows of molded objects. Sheet 10 next passes between six corresponding punch and die members carried on punch plate 16 and die plate 17, respectively. Punch plate 16 is actuated by pneumatic cylinder 18 so that the plurality of punches carried thereon will simultaneously pass through a matching number of dies on die plate 17. The basic trim press may be any suitable apparatus known in the art such as a Brown trim press Model No. TP10 from Brown Machine Co, Inc., Beaver Town, Michigan.

Figure 2:
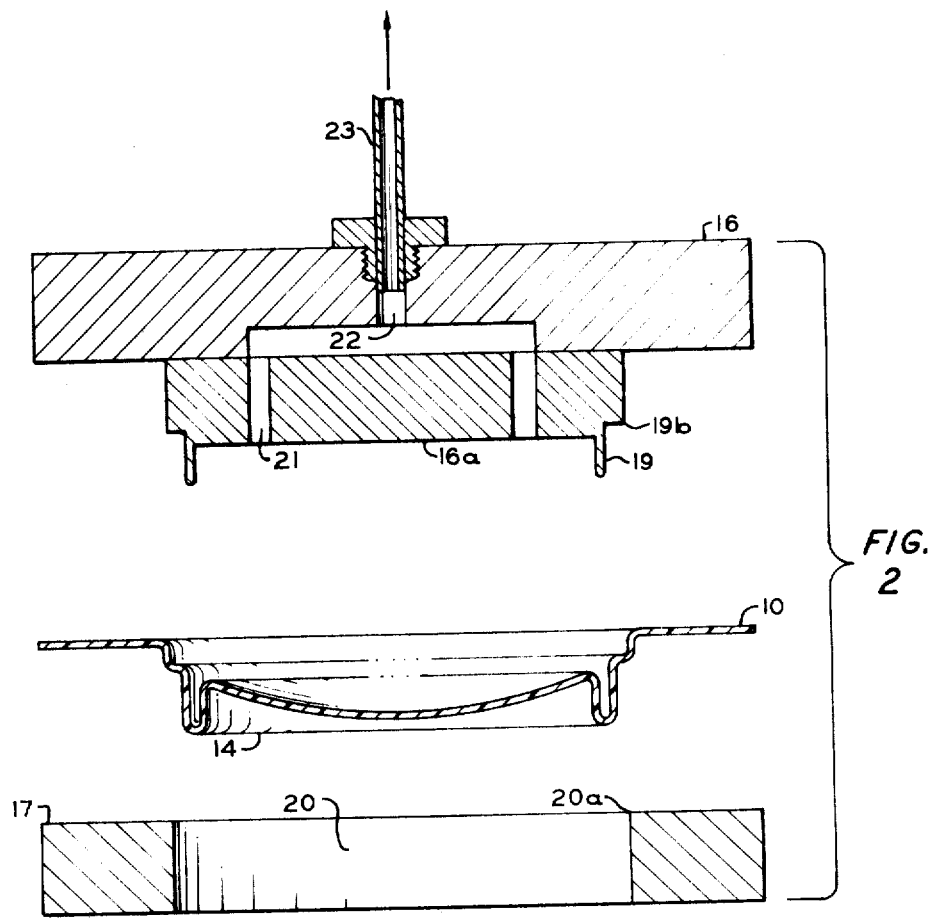
FIGURE 2 is a sectional view of the matching punch and die means of this invention.

Now referring to FIGURE 2 in conjunction with FIGURE 1, punch members 16a carried by punch plate 16 will be described in greater detail. As illustrated, the periphery of punch member 16a formed by pilot members 19 corresponds substantially with the periphery of formed object 14. Pilot members 19 guide the outer edges of formed object 14 through a corresponding aperture 20 within die plate 17. However, it must be noted that it is not necessary that pilot members 19 correspond exactly to the outer periphery of formed object 14 since it is only necessary that they provide a punching member to act in shearing relationship to the edge of aperture 20. Edge 19b of punch member 19 co-acts with edge 20a of die member 20 to shear the article 14 from the sheet 10. Punch member 16a has at least one, preferably two or more, apertures 21 communicating with annulus 22 through punch plate 16. Annulus 22 communicates with conduit 23 which is connected to a suitable vacuum source such as a vacuum pump.

When operating according to one embodiment of this invention, a transverse row of formed objects 14 is first positioned in substantial alignment with punch members 16a. Punch plate 16 is then actuated and moves toward die plate 17. A continuous vacuum exists through annulus 22 and apertures 21 causing a suction through apertures 21, and as the individual punch members 16a pass toward a corresponding formed object 14 the suction toward the face of each punch member 16a will draw a corresponding formed object 14 thereto. Thus, the action of this suction plus the inward movement of punch plate 16 will cause the periphery of the corresponding formed object 14 to fit over pilot members 19 in a very closely aligned relationship. The longitudinal slits in sheet 10 between the longitudinal rows of formed objects will allow the particular objects which are aligned between punch plate 16 and die plate 17 to independently move toward punch member 16a as the suction from the face thereof acts on the object. Thus, the process of slitting the sheet material will compensate for distortions such as shrinkage of the sheet material which occurs in the heating and vacuum forming zone.

Figure 3:
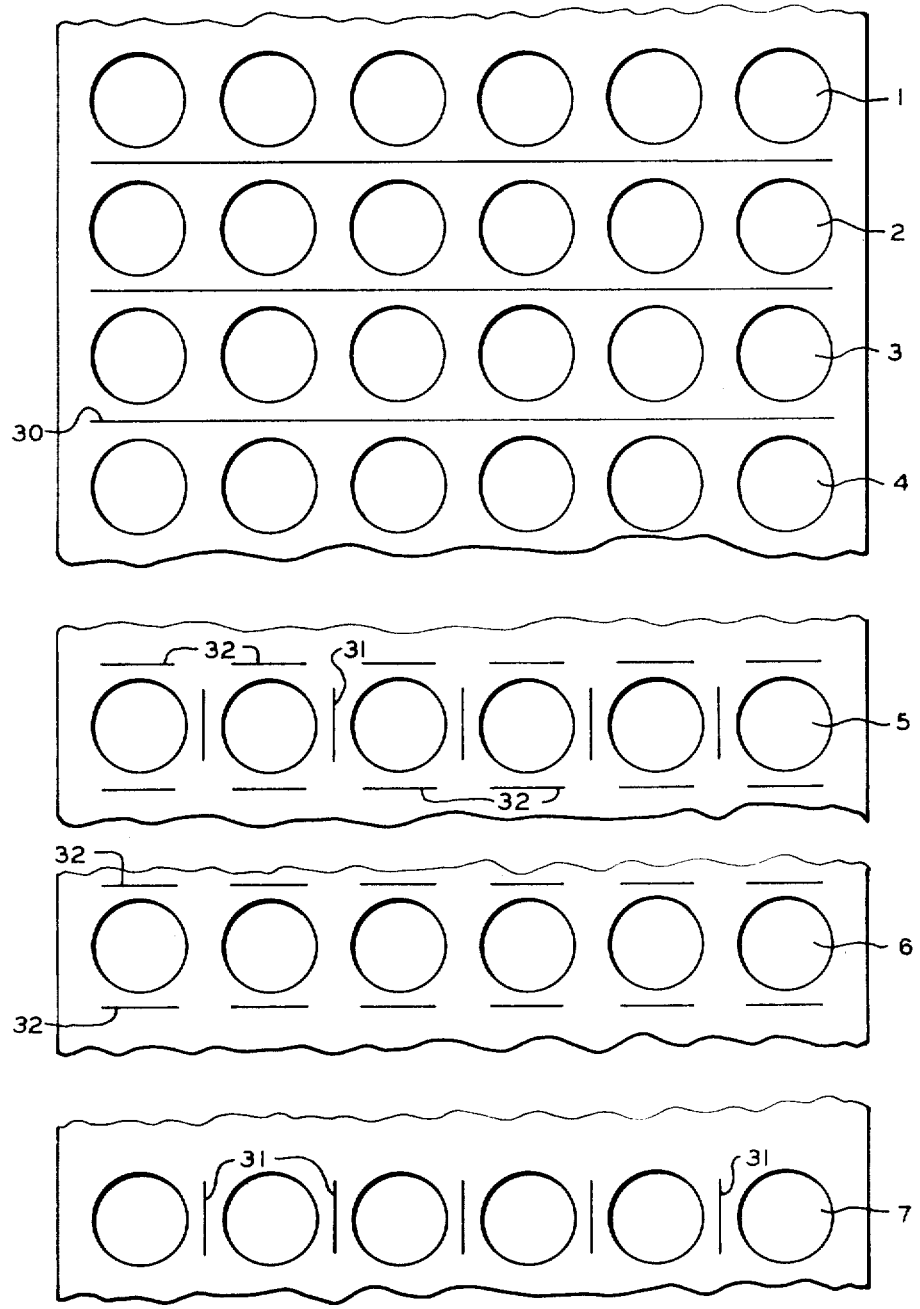
FIGURE 3 is a schematic illustration showing various sheet-slitting techniques of this invention.

The particular manner of slitting the sheet material between rows of formed objects can be varied as illustrated in FIGURE 3. FIGURE 3 illustrates four ways of slitting the sheet instead of the continuous longitudinal slits as illustrated in FIGURE 1. As shown in FIGURE 3, transverse rows 1 through 4 are separated by transverse slits 30 which generally cover the transverse distance between the outer peripheries of the two outside formed objects in each transverse row. Transverse row 7 illustrates intermittent longitudinal slits 31 between the longitudinal rows of formed objects on sheet 10. Transverse row 6 illustrates intermittent transverse slits 32 between each transverse row of objects on sheet 10. Transverse row 5 illustrates that the combination of intermittent transverse and intermittent longitudinal slits 31 and 32 can also be utilized to compensate for distortion of sheet 10. When using intermittent slits, it is generally preferred that each slit be centered betweem two adjacent formed objects, and that each slit be from 10 to 100% as long as the length of the corresponding adjacent average side of each formed object.

Again referring to FIGURE 1, after pneumatic cylinder 18 is actuated and punch plate 16 moves forward to die plate 17 causing individual punch members 16a carrying individual formed objects 14 to pass through a corresponding aperture 20 on die plate 17 shearing the individually formed body from sheet 10, the vacuum pull through conduit 23 is cut off causing the suction from aperture 21 to cease. Punch plate 16 is then withdrawn leaving the corresponding severed formed objects 14 deposited on stacking racks 24.

It must be understood that the particular type of thermoplastic material utilized in the preferred embodiment of this invention is not intended to limit the scope of this invention. For example, any thermoplastic sheet material suitable for thermoforming operations can be utilized such as sheet material made from polymers and copolymers of 1-olefins having from 2 to 8 carbon atoms, styrene polymers and copolymers of styrene with other monomers such as acrylonitrile, rubber modified polystyrene, acrylonitrile-butadiene-styrene polymers, vinyl chloride polymers and copolymers, acrylic polymers such as polymers of methyl methacrylate or modified acrylic polymers such as copolymers of methylmethacrylate and α-methyl styrene, cellulosic polymers such as cellulose acetate, and polyamides. Furthermore, it must be understood that this basic invention can be utilized to accurately sever objects from sheet material formed from processes other than vacuum forming such as for example straight mechanical forming and drape forming.

I claim:

1. A method of severing a formed object from a sheet of plastic material wherein a punch member is forced into and aligned with said formed object, and thereafter said punch member carrying said formed object is forced through a die member thereby severing said formed object from said sheet, the improvement comprising pulling said formed object against said punch member with a vacuum source before said severing.

2. The method of Claim 1 wherein a plurality of said formed objects are formed on said sheet and at least two of said objects are simultaneously severed from said sheet.

3. The method of Claim 2 further comprising slitting said web between at least two of said objects to be severed.

4. The method of Claim 3 wherein said objects are molded on said sheet in a plurality of longitudinal rows.

5. The method of Claim 4 and said slitting comprises continuously severing said web longitudinally between said rows.